United States Patent [19]

Strubbe

[11] Patent Number: 4,513,562
[45] Date of Patent: Apr. 30, 1985

[54] COMBINE GROUND SPEED CONTROL SYSTEM

[75] Inventor: Gilbert J. I. Strubbe, Loppem, Belgium

[73] Assignee: Sperry Corporation, New Holland, Pa.

[21] Appl. No.: 599,380

[22] Filed: Apr. 12, 1984

[30] Foreign Application Priority Data

Apr. 15, 1983 [EP] European Pat. Off. ............ 83302133.0

[51] Int. Cl.$^3$ ............................................. A01D 41/02
[52] U.S. Cl. ................................ 56/10.2; 56/DIG. 15
[58] Field of Search ........................ 56/10.2, DIG. 15

[56] References Cited

U.S. PATENT DOCUMENTS

| | | | |
|---|---|---|---|
| 3,606,745 | 9/1971 | Girodat | 56/DIG. 15 |
| 3,935,866 | 2/1976 | Northup et al. | 56/DIG. 15 |
| 4,130,980 | 12/1978 | Fardal et al. | 56/DIG. 15 |
| 4,337,611 | 7/1982 | Mallander et al. | 56/DIG. 15 |
| 4,458,471 | 7/1984 | Herwig | 56/DIG. 15 |
| 4,487,002 | 12/1984 | Kruse et al. | 56/DIG. 15 |

Primary Examiner—Paul J. Hirsch
Attorney, Agent, or Firm—Larry W. Miller; Frank A. Seemar; Darrell F. Marquette

[57] ABSTRACT

A combine harvester having an engine, a traction drive transmission, a header, and a threshing and separating mechanism, is disclosed wherein the combine is provided with a machine throughput control system including a machine loading control loop operable to produce a signal representative of machine loading, and a grain loss control loop operable to produce a signal representative of grain loss. A grain loss controller is continuously operable to establish a causal relationship between machine loading and grain loss. The machine loading signal, the causal relationship current with that machine loading signal, and a reference loss signal is applied to the grain loss controller to derive a reference machine loading signal. A machine loading error signal, produced by summing the representative machine loading signal and the reference machine loading signal, is used to control the machine throughput.

16 Claims, 5 Drawing Figures

COMBINE GROUND SPEED CONTROL SYSTEM

BACKGROUND OF THE INVENTION

This invention relates generally to combine harvesters and, more particularly, to such machines fitted with some form of control system operable to adjust the amount of crop material passing through the machine by varying the ground speed of the combine.

The term "grain" will be used principally throughout this specification for convenience and it should be understood that the term is not intended to be limiting. Thus "grain" refers to that part of the crop which is threshed and separated from the discardable part of the crop material.

The purpose of control systems for combine harvesters is to maximize the capacity of the machine and yet minimize grain loss. Numerous control systems have been proposed but to date, no system has been commercially adapted for combine harvesters primarily because all systems so far proposed are impracticable in the sense that they do not meet the stated objective in a wholly satisfactory manner. The main factor affecting the practicability of combine harvester control systems is that of grain loss. On the one hand, a control system which does not take account of grain loss cannot seriously be entertained because grain loss is a highly critical factor in the harvesting operation. On the other hand, a control system which does take account of grain loss is suspect in that there is presently no method of measuring grain loss in absolute terms. Accordingly, any system relying on a grain loss measurement lacks the required accuracy.

Another problem with utilizing some form of grain loss measurement to effect machine control is that the control loop is relatively slow because a given volume of crop material takes a finite time (typically 10 seconds in conventional combine harvesters and approximately 5 seconds in rotary combine harvesters) to progress through the machine before the grain loss associated with that volume is measured. With such a slow control loop, the control system can become unstable by oscillating between maximum and minimum controls. This problem is also associated with any other parameter of the machine which may be used in the control system and which is related to some crop processing component located in the machine such that there is a significant time delay between crop material entering the machine and the reaching of that component.

Many of the control systems proposed to date adjust the ground speed of the combine harvester in order to control the intake of crop material (i.e. to control machine loading) but other bases of control may be used.

SUMMARY OF THE INVENTION

It is an object of the present invention to overcome the aforementioned disadvantages of the prior art by providing a combine harvester having a viable throughout control system based on the concept of providing a stable control loop associated with machine loading, and by fine tuning that control loop by another control loop associated with grain loss.

According to the present invention there is provided a combine harvester having an engine, a traction drive transmission, a header, and a threshing and separating mechanism wherein the combine harvester is provided with machine throughput control system including a machine loading control loop operable to produce a signal representative of machine loading, the control system further including a grain loss control loop operable to produce a signal representative of grain loss. A grain loss controller is operable continuously to establish a causal relationship between machine loading and grain loss. The machine loading signal, the causal relationship current with that machine loading signal, and a reference loss signal is applied to the grain loss controller to derive a reference machine loading signal. A machine loading error signal, produced by algebraically summing the machine loading signal and the reference machine loading signal, is used to control the machine throughput.

Preferably, the machine loading control loop comprises a sensor operable to measure the torque in the header auger. In this manner, a very fast machine loading control loop is provided, thus giving stability to the control system. This is because the header auger is located virtually at the front of the machine so that there is only a small time delay between crop material entering the machine after having been cut by the sickle bar and reaching the header auger. Furthermore, auger torque provides as good an indication as any other crop processing component of the amount of crop material being handled i.e. machine loading. The machine loading control loop further comprises a PID controller, and the traction drive transmission to which the output of the PID controller is connected.

The machine loading control loop preferably also comprises a machine loading controller which receives an output signal from the machine loading sensor and a ground speed signal, via a time delay operable to present the ground speed signal in phase with the machine loading signal. The machine loading controller is operable continuously to establish a causal relationship between ground speed and machine loading, with the ground speed signal being applied against that relationship current at that time to derive a corresponding representative machine loading signal. Preferably, this representative machine loading signal is used in lieu of the actual machine loading signal for algebraic summation with the aforementioned reference machine loading signal.

The machine loading controller preferably comprises a machine loading parameter estimator operable continuously to establish the causal relationship between the ground speed and the machine loading, a machine loading estimator operable to derive an estimated machine loading signal from the ground speed signal and the causal relationship, and a further time delay operable to present the estimated machine loading signal in phase with the measured machine loading signal to first summing means for algebraic summation to produce an error signal. The machine loading controller may further comprise second summing means for adding the error signal to the estimated machine loading signal to produce the representative machine loading signal already mentioned. The grain loss control loop may comprise a grain loss sensor and a grain loss controller, the grain loss controller receiving the output signal from the grain loss sensor and a signal from the machine loading control loop via a time delay operable to make the machine loading signal in phase with the grain loss signal, and the grain loss controller being operable to establish said causal relationship between machine loading and grain loss, and to derive said reference machine loading signal.

Preferably the grain loss controller comprises a grain loss parameter estimator operable continuously to establish the causal relationship between the machine loading signal received via the time delay and the grain loss signal, and a loss estimator operable to derive an estimated loss signal from the machine loading signal and the causal relationship current therewith. The grain loss controller may also comprise a further time delay operable to present the estimated loss signal in phase with the measured loss signal, first summing means for algebraically summing the estimated loss signal received from the further time delay and the measured loss signal to produce an error signal, second summing means for adding the error signal to the estimated loss signal to produce a representative loss signal, third summing means for algebraically summing the representative loss signal and the reference loss signal to produce a loss error signal, and convertor means for applying the loss error signal against the causal relationship current at that time to derive therefrom the reference machine loading signal.

Alternatively, the grain loss controller may comprise a grain loss parameter estimator operable continuously to establish the causal relationship between the machine loading signal received via the time delay and the grain loss signal first convertor means for applying the grain loss signal against the causal relationship current at that time to derive therefrom an equivalent machine loading signal, first summing means for algebraically summing the equivalent machine loading signal and the machine loading signal received from the time delay to produce an error signal, second summing means for adding the error signal to the measured machine loading signal to produce a revised machine loading signal, second convertor means for applying the reference loss signal against the causal relationship current at that time to derive therefrom a corresponding machine loading signal, and third summing means for algebraically summing the corresponding machine loading signal derived from the reference loss signal and the revised machine loading signal to derive therefrom the reference machine loading signal already mentioned.

The grain loss controller may comprise shift register means to which the machine loading and grain loss signals are applied, and means for establishing said causal relationship means for deriving said reference machine loading signal. Preferably the means for deriving estimated loss signals from machine loading signals, and means for establishing said causal relationship employ a two parameter model, analysis of which may be effected using either the regression analysis or cluster analysis technique.

The two parameter model is expressed as $$L = A + BK \text{ or } L = Ae^{BK}$$

where L equals grain loss, K equals header auger torque, and A and B are relation parameters to be determined by the analysis.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
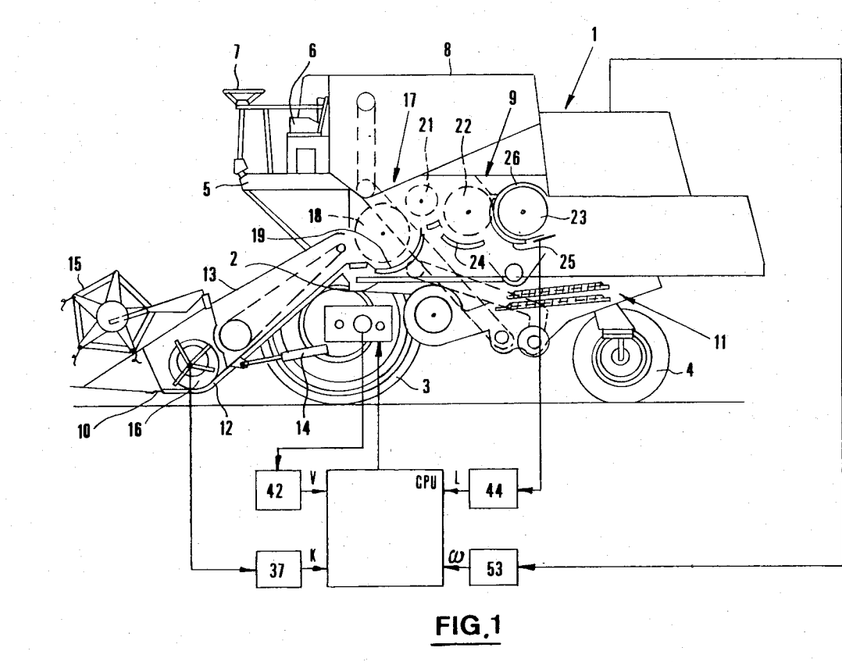
FIG. 1 is a diagrammatic side elevational view of a combine harvester, shown fitted with a machine loading control system incorporating the principles of the instant invention.

With reference to FIG. 1, the combine harvester, generally indicated at 1, comprises a main chassis or frame 2 supported on a front pair of traction wheels 3 and a rear pair of steerable wheels 4. Supported on the main chassis 2 are an operator's platform 5 with a driver's seat 6 and a steering wheel 7, a grain tank 8, a threshing and separating mechanism indicated generally at 9, a grain cleaning mechanism 11 and a conventional engine (not shown). The engine provides the motive power for the various driven components of the machine as well as for the traction wheels 3 which are driven via a conventional belt variator (also not shown). A conventional header 12 and straw elevator 13 extend forwardly of the main chassis 2 to gather crop material and convey it to the threshing and separating mechanism 9. The header 12 is pivotally secured to the chassis 2 for generally vertical movement controlled by extensible hydraulic cylinders 14.

As the combine harvester 1 is propelled forwardly over a field with standing crop, the latter is severed from the stubble by a sickle bar 10 on the header 12, whereafter a reel 15 and a header auger 16 convey the cut crop to the straw elevator 13 which supplied it to the threshing and separating mechanism 9. The crop received within the threshing and separating mechanism 9 is threshed and separated that is to say the crop (which may be wheat, corn, rice, soybeans, rye, grass seed, barley, oats or other similar crops) is rubbed and beaten, whereby the grain, seed or the like, is loosened and separated from the straw, stalks, coils or other discardable part of the crop.

Grain which has been separated from the straw falls into the grain cleaning mechanism 11 which comprises means to separate chaff and other impurities from the grain, and means to separate unthreshed materials (tailings). Cleaned grain is then elevated into the grain tank 8 and the tailings are reprocessed in separate tailings rethreshers (not shown) and returned to the cleaning mechanism 11 for repeat cleaning action.

The header 12 is shown of the grain type, but clearly other forms of header may be employed (for example a corn header), depending on the crop to be harvested. A threshing portion 17 of the threshing and separating mechanism 9 comprises a rotatable threshing cylinder 18 cooperable with a stationary threshing concave 19. Rearwardly of the threshing mechanism 17, a deflector beater, or so-called straw beater, 21 with an associated beater grate is provided. The straw beater 21 has a smaller diameter than the threshing cylinder 18 and is arranged above the level of the discharge end of the threshing concave 19. The straw beater 21 and beater grate have substantially the same width as the threshing mechanism 17.

A separator portion of the threshing and separating mechanism 9 comprises a first separator rotor or cylinder 22 and a second rotor or cylinder 23 cooperable with respective concaves 24 and 25. The second rotor 23 is mounted within a separator housing 26 and both of these components have a width substantially exceeding the width of the first rotor 22 which is the same width as the beater 21 and the threshing mechanism 17. Preferably, the rotor housing 26 has a width approximately twice that of the rotor 22.

The mat of crop material received by the separator rotor 23 from the separator rotor 22 is divided into two portions (by means not shown) and moved spirally around the rotor 23 to respective ends thereof to complete the separating action. On reaching the ends of the rotor 23, the mats of crop material (straw) are propelled by the rotor through respective straw hoods 27 for discharge from the machine.

The components of the combine harvester so far described are disclosed in greater detail in British Specification No. 2,063,033 to which reference is made, and other components, including certain drives, are described in co-pending British Patent Application No. 83,052,58 to which reference is also made. The descriptions of these two references are incorporated herein by reference.

The machine is fitted with a machine loading control system which, in this preferred embodiment, is used to control the ground speed of the machine and is based on the measurement of torque in the header auger 16. This gives a fast, basic slave control loop for the system since the auger 16 is at the front of the machine, whereby virtually instant control of the machine loading can be effected. The fast control loop is "fine tuned" by a slower and master control loop based on grain loss measurement as will now be described more fully.

Figure 2:
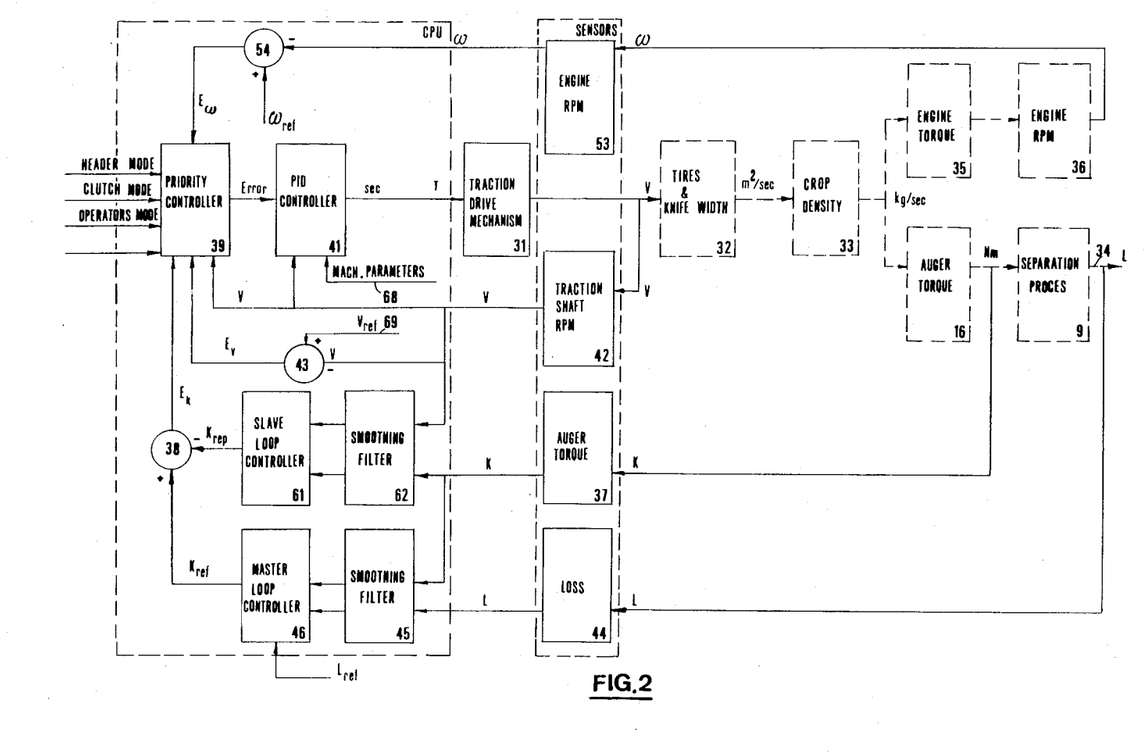
FIG. 2 is a block diagram of the control system shown in conjunction with certain machine operations.

FIG. 2 of the drawings shows a block diagram useful in explaining the present invention in greater detail, the diagram showing not only the control system (in full lines) but also certain operational functions and characteristics of the machine (in broken lines). The control system comprises in fact four control loops: the auger torque or slave control loop and grain loss or master control loop already referrred to; an engine control loop; and a ground speed control loop.

Looking first at the operational functions and characteristics of the combine harvester as depicted in FIG. 2, a traction drive mechanism is indicated at 31 and is in the form of the belt variator already referred to and which has associated with it the usual hydraulic cylinder and valve operable to vary the diameter of one of the sheaves in order to effect the desired change in speed. The revolutions per minute (V) of the output shaft of the traction drive mechanism 31 can be translated into a machine loading characteristic by multiplying by the diameter of the traction wheels 3 and the width of the sickle bar 10 (as indicated at 32) to provide a measure of the area of standing crop being cut per second (m²/sec), and by multiplying the latter by the crop density (as indicated at 33) to provide a measure of the weight of crop material being handled per second (kg/sec). This volume of crop material, when fed to the header auger 16, produces a torque K in the latter in Newton meters. The crop material is then processed by the threshing and separating mechanism 9 and finally discharged from the machine as indicated by the arrow 34, at which point grain loss L can be measured. At the same time, the volume of crop material being handled also produces a torque in the combine harvester engine (as indicated at 35) by virtue of the engine having to drive the various crop processing components, and this in turn determines the rotational speed $\omega$ of the engine (as indicated at 36). Thus there are established four parameters used in the control system, namely header auger torque K, grain loss L, traction drive speed V and engine speed $\omega$.

Looking now at the control system and the auger torque or slave control loop in particular, this comprises a torque sensor 37 which may be associated with the drive to the header 12 in general or with the drive to the header auger 16 in particular the former being representative of the latter. The torque sensor 37 produces an output signal representative of the header auger torque K which may be applied to the negative input terminal of a summer 38. However, preferably, and as is shown in the drawings, a representative auger torque signal $K_{REP}$, derived from the aforementioned signal K, is applied to the input terminal of the summer 38 to reduce the risk of the torque control loop becoming unstable.

$K_{REP}$ is calculated in the slave loop controller 61 to which are applied on the one hand aforementioned auger torque signal K as measured by the auger torque sensor 37 and, on the other hand, the ground speed signal V of the traction drive mechanism 31 as measured by the traction shaft RPM sensor 42. The signals K and V are applied to the slave loop controller via a smoothing filter 62.

Figure 3:
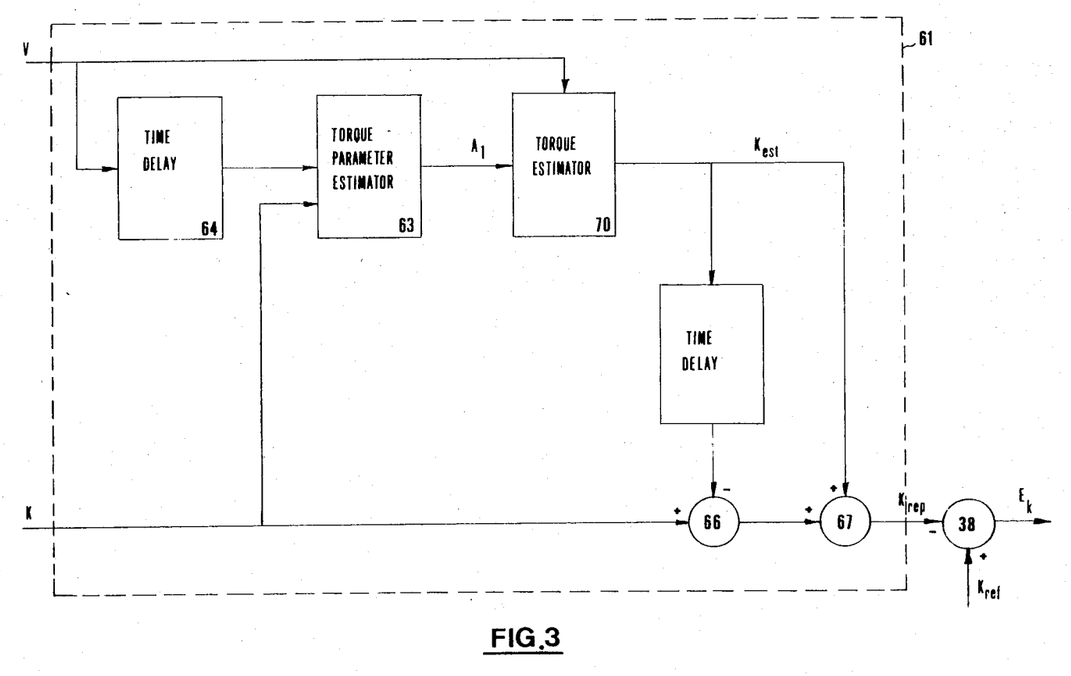
FIGS. 3 and 4 are more detailed block diagrams of parts of FIG. 2.

The slave loop controller 61 is shown in greater detail in FIG. 3 and comprises a machine loading parameter estimator in the form of a torque parameter estimator 63 which is operable to establish the instantaneous causal relationship between ground speed V and auger torque K. This relationship is expressed as:

$$V = A_1 \times K$$

where $A_1$ is a relation parameter to be determined by the estimator.

The ground speed signal V is fed into the torque parameter estimator 63 via a time delay 64 in order to obtain the correct phase relationship between that signal V and the auger torque signal K. The relation parameter $A_1$, determined as indicated above, is applied against the measured ground speed signal V in a machine loading estimator in the form of a torque estimator 70 to derive therefrom an estimated torque signal $K_{EST}$. The estimated torque signal $K_{EST}$ is applied via a further time delay 65, which is basically the same as the time delay 64, to the negative input terminal of a summer 66. The positive input terminal of the summer 66 receives the torque signal $K_{EST}$ is brought in the correct phase relationship and algebraically summed to define a torque error signal.

This torque error signal and the estimated torque signal $K_{EST}$ are summed in a further summer 67 to produce a representative auger torque signal $K_{REP}$, which is thus derived from the measured ground speed V and which is obtained before the corresponding auger torque signal K actually can be measured. It will be appreciated that, in practice, the relation parameter $A_1$ may fluctuate continuously and hence this parameter is continuously being recalculated and applied against the measured speed signals V contiunuously to derive therefrom $K_{EST}$ values. To this end, shift registers can be used advantageously.

As described, the representative auger torque $K_{REP}$ is applied to the negative input terminal of a summer 38 for comparison with a reference auger torque $K_{REF}$ produced by the loss control loop and applied to the positive input terminal of the summer 38. The loss control loop and the reference auger torque $K_{REF}$ will be described in greater detail below. The output $E_K$ of the summer 38 is applied to a priority controller 39, the output of which is applied as a machine loading command signal to a header auger torque controller 41 in the form of a PID (proportional-integrator-differentiator) controller. The torque controller 41 produces an output signal of a given duration (seconds) which is applied to the traction drive mechanism 31, more specifically the control valve of the belt variator already referred to and driving the traction wheels 3 from the combine harvester engine.

The rotational output speed of the traction drive mechanism 31 is measured by the sensor 42, as already described, and the output thereof is fed back directly to the PID controller 41 and the priority controller 39, and indirectly to the priority controller 39 via a summer 43 which receives as a second input 69 a reference ground speed signal $V_{REF}$. Another input 68 to the torque controller 41 is provided by way of signals representative of certain machine parameters such as, for example, the operational characteristics of the belt variator of the traction drive mechanism 31, the operational relationship between the belt variator and the traction drive mechanism (for example, the time to change the variator from minimum to maximum speed), the ratios of the gearbox associated with the engine, and the oil flow per unit time to the control valve. These signals help to achieve a more accurate header auger torque control signal. Additional or alternative parameters may be used.

The torque control loop is designed to accommodate either a hydrostatic traction drive mechanism or the more normal belt variator drive and in the former case the torque error signal $E_K$ is used to actuate a control valve, whereas in the latter case a "high" (typically 12 volts) $E_K$ signal is a measure of the change in ground speed required. The $E_K$ signal passed through the priority controller 39 preferably is applied to a proportional-integrator-differentiator (PID) controller (FIG. 2) for controlling the traction drive mechanism 31. However the signal $E_K$ also could be applied to a proportional (P) or a proportional integrator (PI) controller.

The torque control loop is enabled if the following conditions are met:
1. the system is switched to "automatic";
2. the operator is not claiming priority;
3. the engine RPM is normal;
4. the header 12 is in the operative positon;
5. the engine clutch is operative;
6. the ground speed is greater than a predetermined minimum; and
7. the auger torque is greater than a predetermined minimum, which is a percentage of the empty running auger torque as measured during the start routine of the microprocessor.

The grain loss or master control loop includes a grain loss sensor 44 associated with the grain separation process 9, the output being applied, via a smoothing filter 45, to a grain loss or master loop controller 46. The output from the torque sensor 37 is also applied to the loss controller 46 via the filter 45 and also via a time delay 47. A further input to the loss controller 46 is a reference grain loss signal $L_{REF}$ which is set by the machine operator as is customary. In practice, the operator checks, during a start routine, whether actual grain loss experienced at the rear of the combine is at an acceptable level. Too high losses are, of course, unacceptable because of the amount of grain being lost. Too low losses equally are unacceptable as they mean that the desired maximum combine capacity is not being realized. If actual grain losses experienced correspond to the "desirable" losses, the grain loss signal produced by the grain loss sensor 44 and corresponding to the actual grain losses, is marked as $L_{REF}$ in the microprocessor and put as such in the memory thereof. This is the aforementioned further input to the loss controller 46.

If subsequently during operation of the machine the acceptable loss level is reduced or increased, then $L_{REF}$ is adjusted downwardly or upwardly, respectively, in an electronic manner by a chosen percentage, without the operator having to check again the actual losses occurring at the rear of the machine in the field. It will be appreciated that only a relative loss indication L, rather than an absolute loss indication, is used. The relative loss indication is fully satisfactory in the combination according to the invention. Absolute loss indications are not needed and, moreover, at present no grain loss sensor devices exist which can provide an absolute grain loss measurement.

The output from the loss controller is in terms of a torque reference signal $K_{REF}$ which is applied to the summer 38 along with the representative auger torque signal $K_{REF}$. The output from the summer 38 is an error torque signal $E_K$ and this is applied to the the priority controller 39 as already described.

Figure 4:
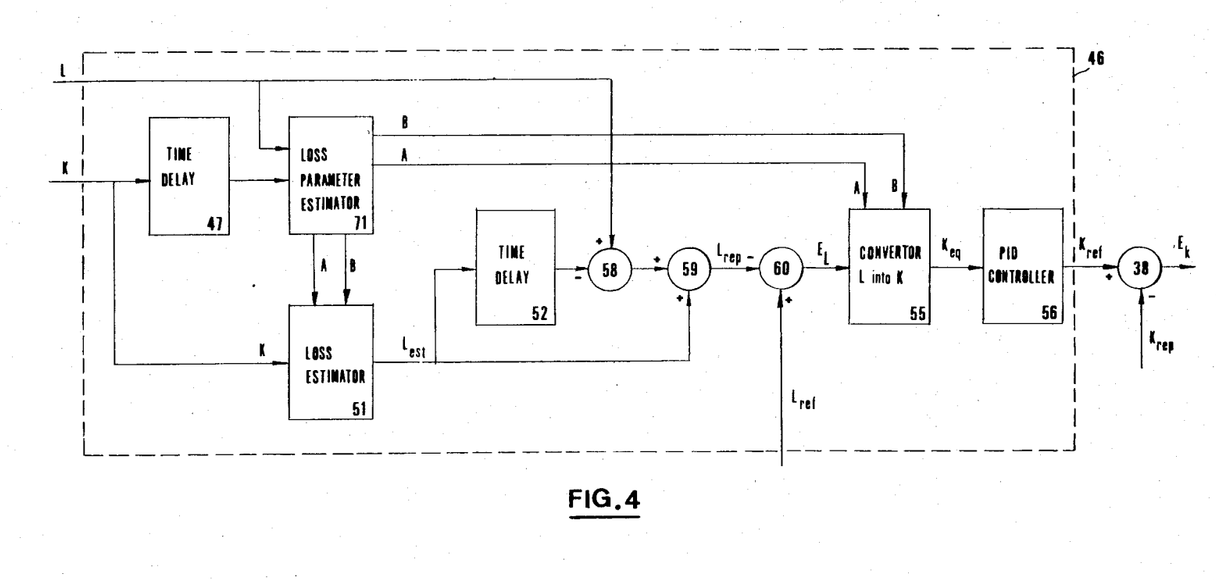

The master loop or loss controller 46 is shown in greater detail in FIG. 4. The auger torque signal K is applied to a loss parameter estimator 71 via a time delay 47 in order to obtain the correct phase relationship between that signal and the grain loss signal L. This is an extremely important aspect of the present invention and is introduced in order to accommodate the time lag discussed above between a given volume of crop material entering the machine and the grain loss associated with that volume being indicated.

The loss controller 46 thus comprises a shift register to which the torque and grain loss signals K,L are applied, the output from the register being subjected to regression analysis and parameter estimation at 71 to establish a relationship between auger torque and grain loss. The regression analysis is based on a two parameter model rather than a single parameter model and this is another important, although optional, feature of the present invention. The relationship between auger torque K and grain loss L is expressed as:

$$L = A + BK \text{ (linear)}$$

$$\text{or } L = AC^{BK} \text{ (exponential)}$$

In the loss parameter estimator 71, the relation parameters A and B, as used in the above equations, are determined. These relation parameters A and B and the auger torque signal K are applied to a loss estimator 51 to derive an estimated loss signal $L_{EST}$ from the measured torque signal K, which signal is representative of the actual loss L which can be expected to occur several seconds later (5 to 10 seconds, depending on the type of combine harvester).

The estimated loss signal $L_{EST}$ is applied to a time delay 52 which, in essence, is identical to the time delay 47 (provided the microprocessor calculation and shifting times are neglected) and which is operable to present the estimated loss signal $L_{EST}$ in the correct phase relationship with respect to the actual measured loss signal L. Both loss signals are applied in the correct phase relationship to the input terminals of an algebraic summer 58 to produce a loss difference signal. The loss difference signal is algebraically added to the estimated loss signal $L_{EST}$ in a further summer 59 to produce a representative loss signal $L_{REP}$ which, in turn, is algebraically compared with the predetermined loss reference signal $L_{REF}$ in another summer 60 to produce a loss error signal $E_L$.

The loss error signal $E_L$ is converted back into an equivalent torque signal $K_{EQ}$ is finally applied to a PID controller 56 to stabilize and accelerate the control loop reaction. The output of the controller is a signal representing a reference torque $K_{REF}$, already referred to, which is applied to the summer 38 as previously described.

The purpose of the summers 58,59,60, the loss parameter estimator 71, and the loss estimator 51 is to reduce the adverse influence of the long process loop time on the stability of the control system. Indeed, there is a considerable loop time between the torque signal K and the corresponding loss singal L as has already been explained. Accordingly, it is very important to be able to use in the control system an estimated loss signal $L_{EST}$ in lieu of the actual loss signal L, which becomes available at too late a point in the loop to be useful. Actually, the estimated loss signal $L_{EST}$ is used in the control system before the actual corresponding loses occur. Obviously, the estimated loss signal $L_{EST}$ should be as close as possible to the actual loss signal L as is accomplished by the various steps as defined above.

As an alternative to regression analysis, the cluster analysis method may be employed which reduces the number of calculations required but still provides the required relationship between machine loading (represented by auger torque K) and grain loss which must be established in accordance with the present invention. In the present embodiment, this relationship is updated every five seconds, simultaneously with the production of $K_{REF}$. However, the frequency of these two operations need not be the same. The operational frequency of the slave torque control loop may be faster than the grain loss control loop. The basic data such as $\omega$ and V is "read" every 0.1 seconds.

It will be appreciated from the foregoing that the loss controller 46 serves to establish a causal relationship between auger torque and grain loss, each auger torque signal K being applied against that relationship to provide a corresponding estimated grain loss signal from which is derived, as described above, a reference torque signal $K_{REF}$. It will be appreciated that the torque/grain loss relationship established can only represent a trend since grain loss cannot be received in absolute terms.

Looking now at the two other control loops of the control system, the engine control loop comprises a sensor 53 operable to sense the rotational speed $\omega$ of the output shaft of the engine of the combine harvester, the output of the sensor being applied as one input to a summer 54 which receives a predetermined reference signal $\omega_{REF}$ as a second input. The difference between these two inputs to the summer 54 is fed as an error signal $E_\omega$ to the priority controller 39. The ground speed control loop comprises the sensor 42 and summer 43, the loop being completed, as with the other loops, by the priority controller 39, PID controller 41 and the traction drive mechanism 31. The summer 43 receives the ground speed signal at its negative input terminal and a reference ground speed signal $V_{REF}$, already mentioned but still to be described in further detail hereinafter, at its positive input terminal, and is operable to derive therefrom, via algebraic summation, a ground speed error signal $E_V$ which is used under certain conditions to control the ground speed.

The priority controller 39 is provided in order to introduce certain safeguards into the control system. As already described, the priority controller 39 receives as inputs the engine speed error signal $E_\omega$ from the summer 54, and the traction drive mechanism rotational speed V from the sensor 42. In addition, the priority controller 39 receives input signals representative of the header mode, the clutch mode and the operator's mode. "Header mode" is meant as an indication of whether the header 12 is in the lowered, operative position of FIG. 1, or the raised, inoperative position. "Clutch mode" is meant to indicate whether the clutch associated with the traction drive mechanism is operative or inoperative. "Operator's mode" is meant as indicating whether the operator is claiming priority over the automatic control system for manual intervention, or whether the automatic control system is controlling the operation of the machine.

Still further inputs to the priority controller 39, which are not specifically recited in FIG. 2, are a time delay, a minimum auger torque and minimum ground speed, these inputs being predetermined. The time delay is used to allow $K_{REF}$ to be established only after the predetermined delay following the enabling of the torque control loop. This avoids the loss control loop functioning during a transient period when the grain loss is not stabilized.

First overriding priority is given to the operator in the event he wants manually to intervene in the operation. Under this condition of manual intervention, the electronic circuitry remains operative as far as measuring, calculating and memorizing are concerned. Only the actuation of the traction drive adjusting mechanism by the electronic circuitry is interrupted as such actuation is done manually at that moment. Second overriding priority is given to an ON/OFF switch. If the switch is on "OFF", the electronic circuitry again continues to measure, calculate and memorize; however, actuation of the traction drive adjusting mechanism by the electronic circuitry is excluded.

Third overriding priority is given to the engine control loop on the basis that if, for whatever reason, engine torque increases to such an extent that the engine suffers a serious decrease in output RPM (and may stall) then plugging of the machine can occur, which must be avoided. The reference signal $K_{REF}$ is set to represent the engine speed when the machine is empty and this is compared with the actual speed $\omega$ and if the difference ($E_\omega$) exceeds a predetermined value, the priority controller 39 effectively renders all of the other control loops inoperative. The $E_\omega$) signal produces, in this circumstance, an output signal from the priority controller 39 which reduces the ground speed of the machine and this signal is maintained for as long as $E_\omega$ exceeds the predetermined value. Thus the loading of the machine is reduced (as a result of the decrease in ground speed) until the engine torque drops to a value where $E_\omega$ no longer exceeds the preset value.

The torque and grain loss control loops are again rendered inoperative if the header 12 is raised to the inoperative position because crop material is then no longer taken into the machine so that the auger torque and grain loss will decrease with the result that a higher ground speed would be commanded which would be inappropriate. By the same token, de-actuation of the engine clutch also renders the torque and grain loss loops ineffective, otherwise again an inappropriate increase in ground speed would be commanded.

The ground speed control loop has an important function when it comes to manipulating the machine at the end of a run in preparation for the next run or pass. When at the end of a run the machine comes to the so-called headland and runs out the standing crop, the operator normally lifts the header 12. Thus the torque and grain loss loops are rendered inoperative, as already explained, and in this circumstance the operator can freely manuever the machine. Usually, the machine is accelerated while turning on the headland and approaching the standing crop in preparation for the next run. Thus, the machine speed exceeds the normal operating speed. At this moment, the machine is empty, whereby the auger torque is low (empty running torque), and no losses are measured. Hence, provided no precautions were taken, the control system would command an even higher speed as soon as the header is lowered to the operative position, thereby reenabling the torque and grain loss loops. This continues even as the machine is actually entering the standing crop as indeed, auger torque builds up only with a certain time delay and losses occur after an even longer time delay. In reality, however, ground speed should often be reduced substantially and if it is not then eventually this may result in complete plugging of the machine.

Provisions have been made to cope with this problem. As the header is lifted, the ground speed data recorded over the previous 5 seconds is used to calculate a reference speed $V_{REF}$. The same action occurs when the engine clutch is de-actuated or if for any reason the auger torque K or ground speed V drops below respective preset minimum values. The ground speed signal V and the reference speed signal $V_{REF}$ are algebraically summed in the summer 43 to produce a speed error signal $E_V$ which is applied to the priority controller 39.

For as long as either the header 12 is in the inoperative position, the clutch is de-actuated, or the ground speed is below the preset minimum, the entire control system remains inoperative and the operator can freely maneuver the machine while $V_{REF}$ is kept in the memory. As soon as the header 12 is lowered to the operative position (or the clutch re-actuated or ground speed exceeds the preset minimum value), the speed control loop is enabled, provided the auger torque K is below the minimum value. The ground speed error signal $E_V$ derived from the actual ground speed V and the reference ground speed $V_{REF}$, in the manner as described above, is used to control ground speed, whereby a ground speed similar to that pertaining when the machine reached the headland will be implemented. In normal crop conditions, this is an entirely satisfactory procedure because the crop condition is unlikely to change materially between running out of the crop at one point and re-entering the crop at an adjacent point. Thus, in practice, when entering the crop for a new run or pass, and depending on the actual ground speed, usually an initial ground speed decrease is commanded and effected rather than a ground speed increase. Thus, the above discussed problem is adequately solved.

Once the auger torque K exceeds the predetermined value on crop material once again being fed to the auger 16, then the torque control loop is enabled and the control system operates in the manner described. The loss control loop is enabled only after the expiration of a preset period of time following the enabling of the torque control loop. This avoids the loss control loop functioning and producing corrective actions, during a transient period needed for the grain losses to stabilize. For as long as the loss control loop is not yet enabled, a $K_{REF}$ value, which was calculated at the end of the next preceding normal operating condition and memorized in the microprocessor, is applied to the positive input terminal of the summer 38 for enabling the torque controller loop for proper operation.

The use of the auger torque for the basic control loop of the control system is preferred because the auger is located virtually at the front of the machine so that the control loop is fast and hence stable. Also, since machine plugging is a real danger, then to monitor the auger torque is a good indication in this respect and quick action can be taken to avoid actual plugging. Furthermore, machine loading in general is an indication of grain loss on the basis that the more heavily the machine is loaded, the greater the grain loss is likely to be, although this is not necessarily so. Therefore, some crude grain loss control is effected merely by controlling the combine harvester on the basis of loading, this control being refined by the provision of the grain loss control loop.

Machine loading can be monitored in other ways, such as by sickle bar power consumption (although this would be less desirable as the cutting height and knife sharpeness would introduce inaccuracies), the displacement of the undershaft of the straw elevator 13, power consumption or torque in the threshing and separating components, or engine power or torque or contactless microwave crop density measurement in front of the header. However, auger torque monitoring is preferred because of the resulting fast control loop and because it can be universally used with all types of headers such as grain headers and corn headers, for example.

With the use of the engine control and ground speed control loops in addition to the auger torque and grain loss control loops, the preferred embodiment gives rise to a very practicable control system. The refinement afforded by the ground speed control loop is especially welcome in that if the operator attempts to re-enter the standing crop at too high a speed, the speed control loop will command a lower speed (based on that previously pertaining) and hence avoid machine plugging. Equally, the top priority given to the engine control loop avoids plugging. The control system reduces operational costs since it reduces, if not obviates, the incidence of machine plugging and maintains grain loss substantially constant with respect to the level of grain loss set by the operator. Also operator fatigue is reduced since many of the checking, controlling and adjusting functions previously attended to by the operator are now carried out by the automatic control system.

Figure 5:
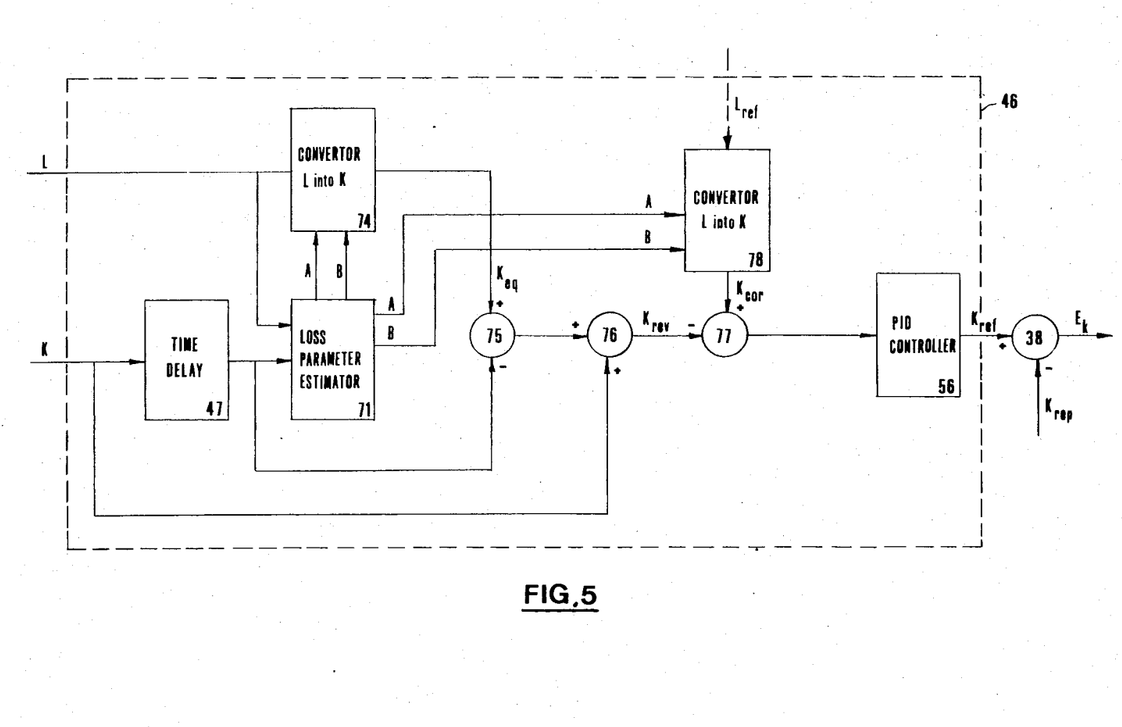
FIG. 5 is an alternative block diagram to that of FIG. 4.

With reference to FIG. 5, an alternative arrangement for the master loop or loss controller 46 shown in FIG. 4 will now be described. Basically, in the arrangement according to FIG. 4, torque values K are converted into equivalent loss values prior to making comparisons and calculations. The results of the comparisons and calculations are converted back into torque values towards the end of the control loop to produce the desired $K_{REF}$ value.

In the arrangement according to FIG. 5, precisely the opposite is done to the extent that loss values are converted into equivalent torque values prior to comparison and calculation. Thereby, it is not necessary to convert the results of the calculations back into torque values at the end of the control loop. As in the arrangement of FIG. 4, the loss controller 46 of FIG. 5 also comprises a shift register to which the torque and grain loss signals K, L are applied, the output from the register being subjected to regression analysis and parameter estimation at 71 to establish a relationship between auger torque and grain loss. Again, a time delay 47 is provided for presenting the torque signal K in correct phase relationship with the loss signal L to the loss parameter estimator 71.

The parameters A and B defined in the estimator 71 are used in the convertor 74 to convert the loss signal L to an equivalent torque signal $K_{EQ}$. This equivalent torque signal $K_{EQ}$ is algrebraically summed in the summer 75 with the corresponding, i.e., delayed, torque signal K to produce a torque error signal at the output thereof. The torque error signal is algebraically added to the torque signal K (not delayed) in the summer 76 to produce a revised torque signal $K_{REV}$.

Using in a convertor 78 the relation parameters A and B as produced in the parameter estimator 71, a predetermined loss reference signal $L_{REF}$ is converted into a corresponding torque reference signal $K_{COR}$ which is fed to the positive input terminal of yet another summer 77 for comparison with the revised torque signal $K_{REV}$ which is applied to the negative input terminal of that summer. The output of the summer 77 is a torque error signal which is fed to the PID controller 56 to stabilize and accelerate the control loop reaction and to produce the reference torque signal $K_{REF}$ which is applied to the summer 38 as already described.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without department from the scope of the invention. Accordingly, the following claims are intended to protect the invention broadly as well as in the specific form shown.

Having thus described the invention, what is claimed is:

1. In a combine harvester having an engine, a traction drive transmission, a header, a threshing and separating mechanism, and a machine throughput control system including a machine loading control loop operable to produce a signal representative of the machine loading, an improved throughput control system comprising:
   a grain loss control loop operable to produce a signal representative of grain loss;
   a grain loss controller operable continuously to establish a causal relationship between machine loading and grain loss, the machine loading signal, the causal relationship current with that machine loading signal, and a reference loss signal being applied to the grain loss controller to derive a reference machine loading signal therefrom; and
   means for algebraically summing the machine loading signal and the reference machine loading signal to produce a machine loading error signal which is used to control machine throughput.

2. The combine harvester of claim 1 wherein the machine loading control loop comprises:
   a machine loading sensor;
   a machine loading controller which receives the output signal from the machine loading sensor and a ground speed signal from a ground speed sensor via a time delay operable to present the ground speed signal in phase with the machine loading signal; and
   means for continuously establishing a causal relationship between the ground speed signal and the machine loading signal, the ground speed signal being applied against the causal relationship current at that time to derive the corresponding representative machine loading signal.

3. The combine harvester of claim 2 wherein the machine loading controller comprises:
   a machine loading parameter estimator operable continuously to establish said causal relationship;
   a machine loading estimator operable to derive an estimated machine loading signal from the ground speed signal and the causal relationship;
   a further time delay operable to present the estimated machine loading signal in phase with the measured machine loading signal to first summer means for algebraic summation to produce an error signal; and
   second summer means for adding the error signal to the estimated machine loading signal to produce said representative machine loading signal.

4. The combine harvester of claim 3 wherein the grain loss control loop comprises a grain loss sensor, the grain loss controller receiving the output signal from the grain loss sensor and a signal from the machine loading control loop via the time delay operable to place the machine loading signal in phase with the grain loss signal for the grain loss controller to establish the causal relationship between machine loading and grain loss.

5. The combine harvester of claim 4 wherein the grain loss controller comprises:
   a grain loss parameter estimator operable continuously to establish the causal relationship between the machine loading signal and the grain loss signal;
   a loss estimator operable to derive an estimated loss signal from the machine loading signal and the causal relationship current therewith;
   an additional time delay operable to present the estimated loss signal in phase with the measured loss signal;
   first summer means for algebraically summing the estimated loss signal received from the additional time delay and the measured loss signal to produce an error signal;
   second summer means for adding the error signal to said estimated loss signal to produce a representative loss signal;
   third summer means for algebraically summing the representative loss signal and the reference loss signal to produce a loss error signal; and
   convertor means (55) for applying the loss error signal against the causal relationship current at that time to derive therefrom the reference machine loading signal.

6. The combine harvester of claim 4 wherein the grain loss controller comprises:

a grain loss parameter estimator operable continuously to establish the causal relationship between the machine loading signal, received via a time delay, and the grain loss signal;

first convertor means for applying the grain loss signal against the causal relationship current at that time to derive therefrom an equivalent machine loading signal;

first summer means for algebraically summing the equivalent machine loading signal and the machine loading signal received from the time delay to produce an error signal;

second summer means for adding the error signal to the measured machine loading signal to produce a revised machine loading signal;

second convertor means for applying the reference loss signal against the causal relationship current at that time to derive therefrom a corresponding machine loading signal; and third summer means for algebraically summing the corresponding machine loading signal derived from the reference loss signal and the revised machine loading signal to derive therefrom the reference machine loading signal.

7. The combine harvester of claim 4 wherein a first PID controller is provided in the machine loading control loop, an input of which is formed by the machine loading error signal and the output of which is connected to the traction drive transmission, a second PID controller being provided in the grain loss control loop, the output of which is formed by the reference machine loading signal.

8. The combine harvester of claim 7 wherein the throughput control system comprises shift registers to which the measurement signals are applied for determining said causal relationships.

9. The combine harvester of claim 4 wherein the means for establishing the causal relationship between the machine loading and grain loss are based on a cluster analysis of a two parameter model.

10. The combine harvester of claim 9 wherein the causal relationships are updated at a predetermined interval.

11. The combine harvester of claim 10 wherein the response of the machine loading control loop is faster than that of the grain loss control loop.

12. The combine harvester of claim 11 wherein the throughput control system further comprises:

a ground speed control loop having a sensor operable to measure ground speed of the machine;

memory means for storing ground speed data pertaining to a predetermined period of time of normal machine operation;

calculator means for calculating a reference ground speed from the memorized data pertaining to the predetermined period of time of normal machine operation preceding a period of time in which the machine is in a mode of operation in which at least one of the current machine loading data, grain loss data and ground speed data does not meet preset criteria; and summer means to which the output of the ground speed sensor is applied together with the calculated reference ground speed, the output of the summer means being a ground speed error signal which is used to control the ground speed when the machine is returning to a normal machine operation condition from the operation mode in which at least one of the current machine loading data, grain loss data and ground speed data does not meet said preset criteria.

13. The combine harvester of claim 12 wherein the throughput control system further comprises an engine control loop having a sensor operable to measure the rotational output speed of the engine, and a summer to which are applied the output signal of the engine speed sensor and a predetermined reference speed signal, the output of the summer being an engine speed error signal used to control machine throughput if the rotational output speed falls below a predetermined reference speed.

14. The combine harvester of claim 13 wherein the throughput control system further comprises a priority controller common to all the control loops and arranged to give overriding priority to the engine control loop, such that if the rotational speed falls below a predetermined reference speed, all other control loops are rendered inoperative.

15. The combine harvester of claim 14 wherein the priority controller also receives input signals representative of other parameters of the machine which determine whether one or more control loops of the throughput control system should be rendered inoperative.

16. The combine harvester of claim 15 wherein the header includes an auger, the machine loading sensor being a torque sensor operable to measure the auger torque.

* * * * *